April 15, 1958
E. SAUER
2,830,513
DEVICE FOR SECURING EXCHANGEABLE OBJECTIVES
TO A PHOTOGRAPHIC CAMERA
Filed April 27, 1953
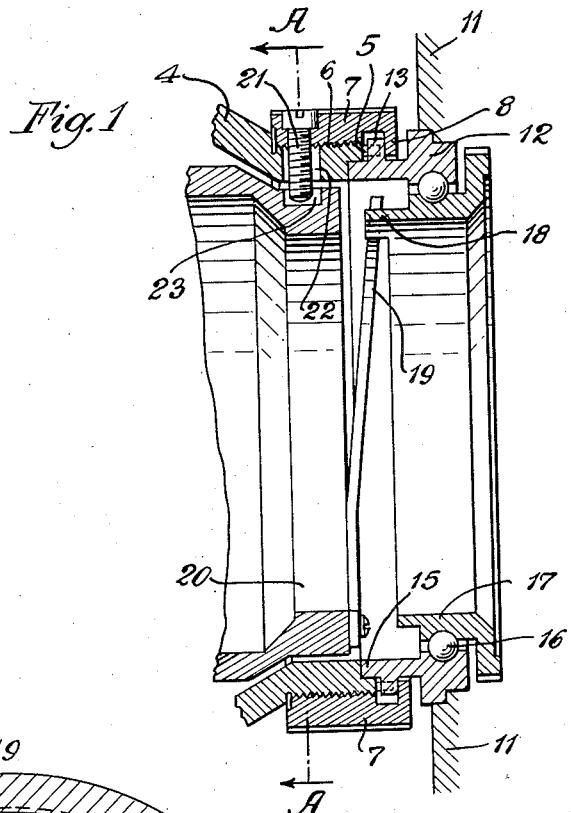
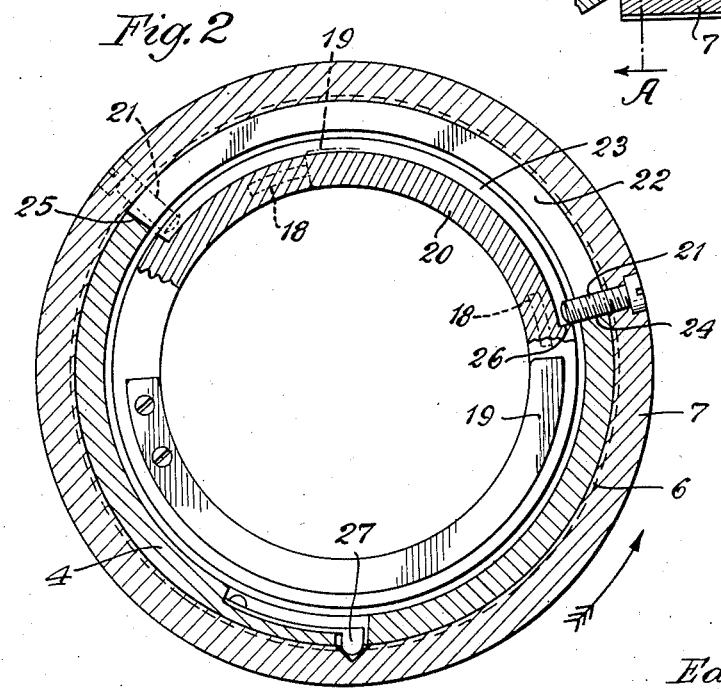
Inventor
Edgar Sauer
by Singer, Stern & Carlberg
Attorneys

United States Patent Office 2,830,513
Patented Apr. 15, 1958

2,830,513

DEVICE FOR SECURING EXCHANGEABLE OBJECTIVES TO A PHOTOGRAPHIC CAMERA

Edgar Sauer, Stuttgart, Germany, assignor to Zeiss Ikon A. G. Stuttgart, Stuttgart, Germany Application April 27, 1953, Serial No. 351,171

1 Claim. (Cl. 95—64)

This invention relates to a device for securing exchangeable objectives to a photographic camera.

For securing exchangeable objectives to a photographic camera it is known to use a turnable bayonet ring which in combination with a slide coupling locks the objective and the camera to each other in the required angular position.

An object of the invention is to utilize the pivotal movements of the bayonet ring in a device of the type referred to for other operations in the release position of the bayonet ring and in the lock position thereof.

Another object of the invention is to provide a device having a bayonet ring of the type indicated which is disposed on the camera or, still better, on the objective and which serves as an operating means for other members in the device.

A further object of the invention is to provide a device having a bayonet ring of the type indicated adapted to perform additional operations which previously had to be carried out manually in the exchange of the objective.

Still another object of the invention is to provide a device having a bayonet ring of the type indicated which, in the assembling of the objective and the camera, guides interconnecting coupling members in a manner suitable for the assembling.

In a preferred embodiment of the invention the bayonet ring is connected with a coupling member on its holder (objective or camera) in such a way that it, in the release position, moves to its position corresponding to its maximum range of movement in one direction and, when moved back to the lock position, allows said coupling member to move back into engagement with a corresponding coupling member on the other part (camera or objective, respectively). Upon the application of an exchangeable objective on the camera the coupling member on one of said parts first occupies an extreme angular position from which it always, without fail, arrives into engagement with the corresponding coupling member on the other part during the locking procedure, no matter what angular position said second coupling member happens to occupy. For this purpose a lug on the bayonet ring cooperates with a shoulder on one of the coupling members which is actuated by a return spring.

Preferably, according to the invention, the coupling in a shutter adjustment device is controlled by the bayonet ring, whereby an actuating member for the shutter in the objective is disposed on the camera within reach of a finger on the hand which holds the camera. However, the bayonet ring can also serve to control the coupling in a distance adjusting device between a distance measuring device or a frosted glass sight on the camera and the adjustment member of the objective, or in exchangeable objectives provided with a central shutter it actuates the coupling of the shutter tensioning device or a time adjusting device which is operable by a member on the camera. In these cases, the bayonet ring is a control means for other members of the same part (objective or camera) on which it is disposed. The bayonet ring may also actuate members on the other part (objective or camera). For example, when it is disposed on the objective, it may actuate a stop for the shutter release mechanism on the camera which, in a known manner, frees the release means when the objective is adjusted and locked correctly only.

Accordingly, it is advantageous to adapt the bayonet ring for control of a plurality of members, particularly connection means between the camera and the objective, and to provide said bayonet ring with suitable control members for this purpose.

Other objects and advantages will be evident from the following description with reference to the accompanying drawings, in which:

Fig. 1 shows a longitudinal axial section through the fastening device and

Fig. 2 shows a cross section on line A—A of Fig. 1.

The unshown optical part of the objective is adjustable lengthwise by means of screw threads in the holder 4 in a well known manner for the purpose of sharp adjustment. The holder 4 is, on its rear end, provided with projections 5 and carries on an exterior screw thread 6 a ring 7 provided with interior bayonet cams 8. The front wall 11 of the camera is provided with a stationary ring 12 which has exterior bayonet joint cam lugs 13, some or all of which are provided with recesses extending completely through said cam lugs and adapted to receive the projections 5 of the objective mount 4. Furthermore, the ring 12 is provided with a centering shoulder 15.

A ring 17 is rotatably mounted in the ring 12, preferably on a ball bearing assembly 16. Said ring 17 serves in this case to operate and position the objective diaphragm or to retain the momentary position of the same and said ring 17 will be actuated by an operating member disposed in a suitable position in the camera. A nose 18 on the front-surface of the ring 17 forms a coupling member in the camera for cooperation with a connecting coupler member 19 in the exchangeable objective. Said connecting coupler member 19 is secured to the adjustment ring 20 of the diaphragm in the objective and consists, for example, of a semi-circular leaf spring. It is unessential to the invention, whether the adjustment of the diaphragm is actuated from the camera, as assumed in the present embodiment, or whether it is operated from the objective and adapted to transmit the diaphragm adjustment for indicating or influencing other factors in the camera. It is essential that upon securing of the replaceable objective on the camera, the operating members 20 and 17 always occupy the same mutual driving connection through engagement between their coupling members 19 and 18, no matter what angular position said coupling members occupy in their holders 4 and 11 as well as in relation to each other.

For this purpose an interior lug, for example, a screw 21, on the rotatable bayonet ring 7 extends through a slot 22 in the objective holder 4 into a recess 23 in the adjustment ring 20 of the diaphragm and cooperates with shoulders 24, 25 and 26, respectively, in the slots 22 and the ring 20, respectively, to limit rotational movement of the bayonet ring in the following manner.

When the objective is removed from the camera, the bayonet ring 7 occupies its release position (Fig. 2) in which it may be frictionally held by means of a yielding latch 27. Its bayonet cams 8 thereby occupy such an angular position in relation to the projections 5 (slide coupling) that when the objective is placed on the camera, i. e., when the projections 5 are introduced in the recesses of the bayonet cams 13 of the camera, the bayonet cams 8 on the objective can be moved into position between the cams 13. In this release position the interior lug 21 of the bayonet ring 7 is in engagement with the shoulder 24 of the slot 22 in the objective holder 4 (to the right in Fig. 2) and thus forms an abutment limiting the rotational movement of the bayonet ring 7. It has thereby, through engagement with the shoulder 26 of the recess 23, brought the adjustment ring 20 of the diaphragm into the rotary position corresponding to the limit of displacement in one direction. The diaphragm is thereby entirely open. This openings of the diaphragm takes place against the action of a spring (not shown) which can be provided in the objective holder 4 and has a tendency to contract the diaphragm to its smallest opening by rotation of the adjustment ring 20 in a counter clockwise direction. The latch 27 prevents any unintentional movement of the diaphragm and turning of the bayonet ring 7 from its release position by means of the spring.

In mounting the objective on the camera, said objective is brought onto the centering shoulder 15 of the camera by a sliding movement with the bayonet ring 7 in its release position whereby the bayonet cams 8 pass the lugs 13 and the slide coupling 5—13 is established. If the bayonet ring 7 occupies any other position except its release position, the objective cannot be mounted on the camera. When mounted as described above, it is accurately centered and occupies the exact predetermined angular position on the camera. The interior lug 21 of the bayonet ring 7 and the active end of the coupling member 19 on the adjustment ring 20 of the diaphragm occupy the position shown to the right of Fig. 2. The coupling stop member 18 of the ring 17 can thereby occupy any position within the limits of the rotatory range which is indicated by the end positions of the member 18 shown in dotted lines. The connecting coupler member 19 of the objective has moved outside of this rotational range.

The mounting of the objective is easily accomplished with one hand holding the bayonet ring 7. For locking the objective the bayonet ring 7 is turned by hand in the direction shown by the arrow in Fig. 2. The spring actuated adjustment ring 20 of the diaphragm follows this movement of the lug 21 until the coupling member 19 engages the projection 18 on the controlling ring 17 and thereby couples the members for operating the diaphragm in the objective by operation of the control ring 17 in the camera such that the parts 17, 19 and 20 will be coupled for movement together. At this moment the angular position of the parts 18, 17 and the other cooperating parts, as well as connection means in the camera, corresponds to the diaphragm value to which the objective has been adjusted and this adjustment remains unchanged during subsequent movement of the drive members. In the shown embodiment the operational connection is positive in one direction. Thereby the drive members in the camera may remain in their preadjusted position when the objective again is removed during turning of the bayonet ring in the reverse direction. The operational connection could also be entirely positive in that the elastic coupling member 19 could be made to snap into a face recess of the camera ring 17. This arrangement is feasible when the drive device and the shutter are adapted to be adjusted in the objective and the parts of the drive device in the camera are caused to participate in the movement without any obstruction.

Returning the bayonet ring 7, its cams 8 slide behind the lugs 13 and clamp, through the tightening of the screw thread 6, the objective holder 4 against the front surface of the centering shoulder 15 on the camera.

Up to the moment when the interior lug 21 of the bayonet ring 7 arrives in engagement with the slot shoulder 25, shown to the left in Fig. 2, the bayonet ring 7 has, in the shown embodiment, a range of rotation which is greater by the amount $a$ than the turning range $b$ of the coupling members 18, 19. Thereby it is ensured that upon securing of the objective its coupling member 19 is connected with the coupling member 18 of the camera even if the last mentioned coupling member 18 already occupies this extreme left hand position of rotation. Without detrimental influence on the control action of the bayonet ring 7, the full diaphragm adjustment range is thus obtained for the camera. During its additional rotary distance $a$ the bayonet ring substantially causes close tightening of the objective to the camera.

For removal of the objective, the bayonet ring 7 is turned back in a clockwise direction (Fig. 2). By engagement of its interior lug 21 with the shoulder 26 it thereby brings the shoulder adjustment ring 20 into the extreme right hand rotary position of the coupling member 19 so that the diaphragm again is fully opened. In addition, the bayonet connection 8, 13 is thereby released.

The correct insertion position of the objective holder 4 and also the release position of the bayonet ring 7 thereon can be determined through suitable indication marks on said parts and on the front wall 11 of the casing.

What I claim is:

In a photographic camera adapted to accommodate exchangeable photographic objective mounts provided with a diaphragm operating ring, comprising a camera casing provided with an opening, an objective support ring on said camera arranged in said opening, said support ring being provided with bayonet locking lugs, a bayonet locking ring rotatably mounted on said objective having cam slots for receiving said locking lugs, a projection on said locking ring extending through a circumferential slot in the periphery of said objective mount with its inner end received in a circumferential slot in said diaphragm operating ring and adapted to selectively engage the end walls of said slot to limit turning movement of said diaphragm operating ring, a diaphragm operating member including a sleeve rotatably mounted in said annular support ring having an eccentrically located projection extending toward said diaphragm operating ring, and a coupler member on said diaphragm operating ring including a semi-circular leaf spring member having one end affixed to said diaphragm operating ring and its free end presented in the path of said projection, whereby interchangeable objectives may be attached to said camera when the projection is in a predetermined position so the the diaphragm operating ring of an interchangeable objective will be re-set to the same position as the diaphragm operating ring on a previously removed objective.

References Cited in the file of this patent

UNITED STATES PATENTS

| | | |
|---|---|---|
| 1,973,213 | Kuppenbender et al. | Sept. 11, 1934 |
| 2,172,338 | Mihalyi | Sept. 5, 1939 |
| 2,467,456 | Baer | Apr. 19, 1949 |
| 2,612,093 | Schutz | Sept. 30, 1952 |
| 2,618,201 | Brohl et al. | Nov. 18, 1952 |
| 2,620,712 | Clifford | Dec. 9, 1952 |

FOREIGN PATENTS

| | | |
|---|---|---|
| 882,116 | France | Feb. 15, 1943 |
| 595,371 | Great Britain | Dec. 3, 1947 |
| 990,495 | France | June 6, 1951 |